(12) United States Patent
Maennig et al.

(10) Patent No.: US 8,608,843 B2
(45) Date of Patent: Dec. 17, 2013

(54) PIGMENT PREPARATION AND INK JET PRINTING INK

(71) Applicant: Eckart GmbH, Hartenstein (DE)

(72) Inventors: Joerg Maennig, Painesville, OH (US); Stefan Trummer, Nürnberg (DE); Andreas Kroell, Velden (DE); Dieter Proelss, Schwabach (DE); Stefan Engel, Rückersdorf (DE); Werner Pieper, Concord, OH (US)

(73) Assignee: Eckart GmbH (DE)

( * ) Notice: Subject to any disclaimer, the term of this patent is extended or adjusted under 35 U.S.C. 154(b) by 0 days.

(21) Appl. No.: 13/683,582

(22) Filed: Nov. 21, 2012

(65) Prior Publication Data

US 2013/0088553 A1    Apr. 11, 2013

Related U.S. Application Data

(62) Division of application No. 12/810,916, filed as application No. PCT/EP2008/010888 on Dec. 19, 2008, now Pat. No. 8,333,832.

(30) Foreign Application Priority Data

Dec. 28, 2007  (EP) .................................... 07025171

(51) Int. Cl.
  *C09D 11/02*   (2006.01)
(52) U.S. Cl.
  USPC .................. 106/31.6; 106/31.13; 523/160
(58) Field of Classification Search
  USPC .................. 106/31.13, 31.6, 404; 523/160
  See application file for complete search history.

(56) References Cited

U.S. PATENT DOCUMENTS

| | | | |
|---|---|---|---|
| 4,321,087 A | 3/1982 | Levine et al. | |
| 4,717,424 A | 1/1988 | Wilfinger et al. | |
| 5,944,886 A | 8/1999 | Hashizume | |
| 6,332,943 B1 | 12/2001 | Herrmann et al. | |
| 6,599,965 B2 | 7/2003 | Lane et al. | |
| 2004/0080593 A1* | 4/2004 | Wotton et al. | 347/100 |
| 2004/0173121 A1 | 9/2004 | Fukuo et al. | |
| 2006/0075917 A1* | 4/2006 | Edwards | 101/483 |
| 2007/0100025 A1* | 5/2007 | Steiner et al. | 523/160 |
| 2007/0199478 A1 | 8/2007 | Schlegl et al. | |
| 2008/0081124 A1 | 4/2008 | Sano et al. | |
| 2009/0131584 A1 | 5/2009 | Terao et al. | |
| 2009/0214833 A1 | 8/2009 | Oyanagi et al. | |
| 2010/0279083 A1 | 11/2010 | Trummer et al. | |

FOREIGN PATENT DOCUMENTS

| | | |
|---|---|---|
| EP | 0 240 367 A | 10/1987 |
| EP | 0 390 216 A | 10/1990 |
| EP | 0 899 023 A | 3/1999 |
| EP | 1 205 521 A1 | 5/2002 |
| EP | 1 308 483 A | 5/2003 |
| EP | 1 613 702 | 1/2006 |
| EP | 2 083 052 A1 | 7/2009 |
| JP | 11-323223 | 11/1999 |
| JP | 11-323223 A | 11/1999 |
| JP | A-2008-088228 | 4/2008 |
| WO | WO 2004/035684 A | 4/2004 |
| WO | WO 2004/087816 A | 10/2004 |
| WO | WO 2006/101054 A1 | 9/2006 |
| WO | WO 2006/118577 A | 11/2006 |

OTHER PUBLICATIONS

Office Action dated Sep. 19, 2012 in corresponding Chinese Patent Application No. 2008801276435 (English language translation).
International Search Report dated Feb. 19, 2009, issued in corresponding international application No. PCT/EP2008/010888.
Notice for Reasons for Rejection dated Sep. 3, 2013 in corresponding Japanese Patent Application No. 2010-540054 (with English language translation).

* cited by examiner

*Primary Examiner* — Pegah Parvini
(74) *Attorney, Agent, or Firm* — Ostrolenk Faber LLP

(57) ABSTRACT

The present disclosure is directed to a pigment preparation comprising aluminum effect pigments, a solvent and at least one additive, wherein the aluminium effect pigments have a $d_{98}$ value of the volume averaged particle size distribution curve of less than 15 μm, the at least one additive is a phosphorous containing additive, and the solvent has a viscosity equal to or more than 1.8 mPa's at 25° C. The disclosure is further directed to an ink jet printing ink as well the use thereof.

49 Claims, No Drawings

PIGMENT PREPARATION AND INK JET PRINTING INK

CROSS-REFERENCE TO RELATED APPLICATIONS

The present patent application is a divisional under 37 C.F.R. 1.53(b) of prior U.S. patent application Ser. No. 12/810,916, filed Jul. 12, 2010, by Joerg Maennig, et al., entitled "PIGMENT PREPARATION AND INK JET PRINTING INK," which is a 35 U.S.C. §371 National Phase conversion of PCT/EP2008/010888, filed Dec. 19, 2008, which claims the benefit of European Patent Application No. 07025171.5, filed Dec. 28, 2007, the entire contents of which are incorporated herein by reference.

TECHNICAL FIELD

The present invention is directed to a pigment preparation, an ink jet printing ink containing said pigment preparation and to a method of printing as well as to a method of producing an ink jet printing ink and to the use of the pigment preparation in ink jet printing inks.

BACKGROUND

In ink jet printing technology, tiny drops of ink jet printing ink are projected directly on the surface of a substrate for printing without physical contact between the printing device and the substrate surface. The placement of each drop on the printing surface is controlled electronically. The ink jet printing technology has become an important technology for printing variable data and images on paper, cardboard, etc. on the one hand and on products such as, for example, cans, bottles, foils, etc. on the other hand. It is also possible to directly print on fragile objects such as eggs using ink jet technology. The ink jet technology allows to print these data and images at a high speed.

Various principles have been developed for drop generation in the past such as electrostatic, magnetic, piezoelectric, electro-thermal, mechanical micro-valve, and spark discharge technologies. Regardless of type of drop generation, the ink jet technology is basically classified into two basic categories, namely continuous ink jet—CIJ—and impulse or drop-on-demand—DOD—ink jet technology.

The continuous ink jet technology is characterised by pressurised ink discharge through a nozzle to generate drops of ink directed to the substrate surface in a continuous stream.

The impulse ink jet technology differs from the continuous ink jet technology in that the ink supply is maintained at or near atmospheric pressure. An ink drop is ejected from a nozzle only on demand when a controlled excitation is applied to the drop-generating transducer. The impulse ink jet (or drop-on-demand) technology is primarily used in colour printers.

In recent years colour printers have been developed allowing to produce colour prints with the basic colours yellow, cyan and magenta and occasionally black. These colours are widely used as process colours in established printing processes like lithography, gravure and flexo printing.

In order to further improve the quality of the colour prints, especially in view of the increasing applications for photo printing, so called "spot colours" are used. In offset printing a spot colour is any colour generated by a pure or mixed ink that is printed using a single run. These spot colours can include orange and green in addition to the four basic colours or any other colours which expand the colour gamut and vividness of a printed image.

EP 1 205 521 discloses a pigment preparation for an ink jet process according to which a wide variety of pigments can be used. When producing the pigment preparation all components are comminuted in a mill to obtain a particle size wherein preferably 99% of the particles have a particle size of below 15 µm. Pigments having a particle size of below 1 µm are more or less of spherical nature which are not able to produce a metallic appearance in a print.

JP 11-323223 A discloses an ink jet printing ink containing metallic pigments produced with pvd methods.

Also, WO 2006/101054 A1 describes ink jet printing inks containing pvd-metallic pigments.

However, it turned out that these pvd metallic pigments of the prior art do settle and aggregate when being comminuted. When introducing these comminuted pvd-pigments in printing inks, the aggregates can not be easily disaggregated and are likely to clog the ink jet nozzles of the printer. Moreover, the aggregated pvd metallic pigments have a diminished metallic luster compared to non-aggregated pvd metallic pigments.

SUMMARY

It is an objective of the present invention to provide a pigment preparation comprising aluminium effect pigments particularly suitable for use in an ink jet printing ink as well as an ink jet printing ink allowing to produce prints having a metallic appearance. Another object of the invention is to provide a pigment preparation comprising aluminium effect pigments which do have a reduced tendency to agglomerate when prepared.

The objective is solved by providing a pigment preparation comprising aluminium effect pigments, a solvent and at least one additive, wherein said aluminium effect pigments have a $d_{98}$ value of the volume averaged particle size distribution curve of less than 15 µm, said at least one additive is an phosphorous containing additive, and said solvent has a viscosity of equal to or more than 1.8 mPa·s at 25° C.

Preferred embodiments of the pigment preparation of the present invention are specified in sub-claims 2 to 24.

The object underlying the present invention is also solved by an ink jet printing ink comprising the pigment preparation of the present invention.

Preferred embodiments of the ink jet printing ink of the present invention are specified in sub-claims 26 to 35.

Furthermore, the object of the invention is solved by a method of printing comprising applying an ink jet printing ink of any of claims 25 to 35 on a surface of a substrate using preferably an ink jet printer.

The object of the invention is also solved by a method of producing an ink jet printing ink according to any one of claims 25 to 35, comprising gently mixing the pigment preparation of any one of claims 1 to 24 with components of ink jet printing inks such as solvents, diluents, additives and/or binding agents. Gently mixing of the aluminium effect pigments means that the during the mixing process said aluminium effect pigments are not damaged, i.e. not essentially twisted or bent, what would impair the superior optical properties, such as the reflectance, but essentially only comminuted.

Moreover, the object of the invention is solved by use of the pigment preparation of any one of claims 1 to 24 in ink jet printing inks.

Finally, the object of the invention is solved by an article coated with a pigment preparation according to any one of claims 1 to 24 or with an ink jet printing ink of any one claims 25 to 35. Such an article can be, for example, paper, cardboard, foils made from plastic or metallic material, labels, bottles and containers made from glass, ceramic material, plastic material or metallic material, textiles, etc.

DETAILED DESCRIPTION

With the present invention it has surprisingly been discovered that it is possible to produce ink jet prints having a high class metallic appearance incorporating aluminium effect pigments into ink jet printing inks.

Surprisingly the aluminium effect pigments in the pigment preparation of the present invention have a very low tendency to aggregate, preferably no detectable tendency to aggregate. More surprisingly, even pvd pigments, i.e. pigments produced by physical vapour deposition and subsequent comminution of the produced metallic film, do show a very low tendency to aggregate in the pigment preparation of the present invention.

Probably as a consequence of this strongly reduced tendency to agglomerate, the pigment preparation of the present invention can be more easily incorporated into ink jet printing inks, i.e. without a high risk of incorporating aggregates in the printing ink, why the printing ink of the present invention has an improved quality.

It was surprisingly found out that the viscosity of the solvent used for producing the pigment preparation is very important. The solvent used during the production of the aluminium pigments must have a viscosity of more than 1.8 mPa·s. Preferably the viscosity is within a range of 2.0 mPa·s to 6 mPa·s, further preferred of 2.6 mPa·s to 3.3 mPa·s.

The viscosity is determined at a temperature of 25° C. using a Brookfield rotational viscosimeter LV Model DV-II+ using spindle no. 61 at 100 rpm.

It is further preferred that the evaporation number of the solvent is in a range of 10 to 300, preferably in a range of 20 to 250, further preferred in a range of 80 to 200. The evaporation number is defined relatively to ether at a temperature of 20° C. as specified in DIN 53170.

Particularly useful solvents can be selected from the group consisting of alcohols, glycol ethers, esters, ketons and mixtures thereof.

The term "solvent" does mean according to the present invention a single solvent or a solvent mixture.

Especially preferred solvents are i-propanol, ethanol, butanol, diisobutylketone, butylglycol, butyl glycol acetate.

The very low tendency of the aluminium effect pigments to aggregate is due to the use of a solvent having the aforementioned viscosity, a phosphorous containing additive as well as to the $d_{98}$ value of the volume averaged particle size distribution curve of less than 15 μm.

It is presently assumed that the specific combination of the viscosity of the solvent, the specific particle size distribution as well as the use of a phosphorous containing additive during the production of the pigment preparation of the invention is crucial to obtain the desired essentially non-agglomerating, preferably non-agglomerating, pigment preparation of the present invention.

The pigment preparation can be obtained by wet grinding of aluminium particles, for example in a ball or pearl mill, wherein the aluminium particles are flattened to a plate-like shape. The solvent (or solvent mixture) having a viscosity of more than 1.8 mPa·s as well as the phosphorous containing additive are added together with the aluminium particles to be milled into the ball mill.

The aluminium particles used as a starting material are preferably spherical or almost spherical. It is, however, also possible to use irregular formed aluminium particles or acicular aluminium particles as a starting material.

A process for obtaining ground aluminium effect pigments is described, for example, in EP 1 613 702 A1 which is incorporated by reference therein.

Alternatively, pvd aluminium pigments can be used to produce the pigment preparation of the present invention. In a first step the aluminium is applied by physical vapour deposition on a substrate coated with a release layer. Subsequently, the aluminium film is separated from the release layer. The production of pvd aluminium pigments is known, for example, from U.S. Pat. No. 4,321,087.

The larger particles obtained are then comminuted in the presence of a solvent (or a solvent mixture) having a viscosity of more than 1.8 mPa·s as well as an phosphorous containing additive to obtain the pigment preparation of the invention. The comminution can be effected, e.g., by ultrasonic dispersion, jet milling or colloid milling.

According to a preferred embodiment of the invention, the pigment preparation is produced from aluminium pigment obtained by wet ball or pearl milling of non-flat aluminium particles, without using pvd-technology.

Aluminium effect pigments have a platelet-like form hence they act like micro-mirrors directly reflecting incident light. If the metal pigments are reduced to a size of less than 1 μm ($d_{50}$), they are too small to act as a plate-like mirror. However, if the metal pigment flake size is 1 μm or more ($d_{50}$-value), surprisingly these tiny metal flakes still act as aluminium effect pigments, i.e. are capable to reflect light in a uniform and directed manner.

If the average size is above 15 μm the pigments do not pass any more through the configuration such as tubes, channels, filters, nozzle, etc. of the ink jet configuration. Some part of the whole configuration would be clogged and the ink jet head would be practically inoperable.

The $d_{50}$-value, $d_{98}$-value and $d_{100}$-value refer to the volume-averaged particle size distribution as measured with laser scattering methods. Such particle sizes are determined with instruments such as Cilas 1064.

To give the observer the most appealing view of an image containing aluminium effect pigments it is necessary that the aluminium effect pigments or flakes are not arranged randomly but essentially parallel to the surface of the substrate. In this case the incident light is reflected in a rather uniform way. If the aluminium effect pigments are randomly oriented in the ink jet printing ink the incident light is also randomly reflected which reduces the metallic brilliance and is not attractive to the observer.

After having applied the droplets of ink jet printing ink on a surface of a substrate the ink jet printing ink is dried or cured, for example, by applying heat and/or UV irradiation. This process occurs immediately after ink deposition on the substrate. The period of time for drying or curing is usually in the range of split seconds to minutes, depending on the drying or curing mechanism. During this very short period of time the aluminium effect pigments surprisingly orient essentially parallel to the surface of the printed ink.

Without wishing to be bound by theory it is currently believed that the small size of the aluminium effect pigments in the pigment preparation of the present invention facilitates a rather quick orientation of the aluminium effect pigments in the ink droplets immediately after application.

According to a preferred embodiment of the invention, the aluminium effect pigments in the pigment preparation of the present invention have a $d_{98}$-value (Cilas) in a range of about 1 μm to 12 μm, preferably of about 1.5 μm to 8 μm, most preferably of about 2 μm to below 6 μm.

It turned out that a particle diameter or particle size with a $d_{50}$-value in a range of 1 to 6 μm, preferably of 2 to 5 μm ($d_{50}$-value Cilas) in the pigment preparation of the present invention is very superior in terms of the metallic effect obtained after printing the ink jet printing ink.

Preferably, at least 99% of the particle size distribution curve ($d_{99}$) in the pigment preparation of the present invention is in a range of lower than about 14 μm. More preferably at least 99% of the particle size distribution curve is a range of lower than about 12 μm.

Moreover, it is preferred that the particle size distribution (PSD) of the aluminium effect pigments is very narrow. Preferably 100% of the aluminium effect particles ($d_{100}$) in the pigment preparation of the present invention have a particle size of less than 15 μm, further preferred less than 12 μm.

According to another preferred embodiment of the invention, 100% of the particle size distribution curve is in a range of between 0.5 to 8 μm, further preferred between 1 and 7 μm.

In order to use the established ink jet printing ink technology, it is mostly desirable to use aluminium effect pigments having a diameter at maximum up to 12 μm as, for example, the jet nozzle openings or other parts of the ink jet configuration are usually in a range of about 20 to 50 μm.

Basically, the limitations of the upper size of the aluminium effect pigments are determined by the dimensions of the whole printing configuration such as tubes, channels, filters and jet openings. The printing configuration must be such that it can work as a pump on the ink jet printing ink. If an ink jet print head is for example using a larger jet opening it is also possible to use larger aluminium effect pigments.

It has been shown that the ratio of average size, preferably absolute size, ($d_{50}$-value Cilas) of the aluminium effect pigments to the diameter of the jet opening is advantageously in a range of 0.02 to 0.5 and preferably from 0.03 to 0.2 and most preferably from 0.04 to 0.12.

Platelet-like metal pigments with these average sizes do easily fit through the jet nozzles of the jet print heads usually used.

Preferably, the aluminium effect pigments in the pigment preparation of the present invention exhibit an x-ray diffractogram measured on said aluminium effect pigments in an essentially plane-parallel alignment showing main peaks which are not [111]- or [222]-reflections.

According to a preferred embodiment of the invention the aluminium effect pigments in the pigment preparation of the present invention are obtained by ball milling of, preferably spherical or nearly spherical, aluminium particles or aluminium grit. These aluminium pigments obtained by ball milling differ significantly from pvd-pigments regarding their x-ray diffraction patterns. In order to characterise platelet like aluminium effect pigments by XRD method (X-ray Reflection Diffraction) the pigments are oriented in an essentially plane parallel orientation prior to measurement.

The x-ray diffractogram (XRD) measured on the aluminium effect pigments of the present invention in essentially plane-parallel alignment shows, usually one or two, main peaks which are not [111]- or [222]-reflections.

The measurement can be made on most X-ray diffractometers available on the market.

In the present invention the term "essentially plane-parallel alignment" means that at least 80% of the pigments are oriented in parallel to the substrate surface within a tolerance of +/−15° to the substrate surface.

The denomination "[111] plane" refers to Miller's indices. The [111] plane is the most densely packed diagonal plane of a face-centered cubic lattice.

The [111] reflection of the aluminium effect pigments of the present invention is weak, if visible at all. The [222] reflection is even more weaker and might not be detectable.

The main peaks of the aluminium effect pigments of the present invention are those of the [200] and/or [220] planes. It is especially preferred that the main peak is the one of the [200] plane.

The ratio of the peak intensities of the aluminium effect pigments of the present invention [111]/[200] is always <1. Preferably it is <0.5 and most preferably <0.1.

This result is contrasted by pvd-pigments: these pigments always exhibit main peaks corresponding to the reflexes of the [111]- or the [222]-planes.

These results reflect the well known fact that aluminium which is sputtered onto a foil forms essentially single crystals having the aforementioned reflectivity.

It is assumed that these results reflect the properties of the plastic state of deformation of the aluminium effect pigments during the grinding process.

The usually polycrystalline aluminium powder, which is usually obtained by atomisation of molten aluminium, is subjected to strong shearing forces during the deforming grinding process, using usually balls or spheres as grinding body. The crystallites are sheared against each other whereas the most densely packed [111]-plane represents the plane of shearing. Because the grinding process naturally occurs perpendicular to the surface of the surface of the platelets the [111] planes are broken out of the plane surface. Consequently the peak intensity of the [111] and the second order [222]-planes are decreasing during the ongoing grinding process. At the same time the peaks corresponding to the [200] and the [220]-planes are intensified which finally become main peaks.

In order to produce a pigment preparation of the invention using a wet ball or pearl milling method, aluminium is molten at first molten and subsequently atomized using well established technology. The spherical particles obtained by atomization are subsequently milled in a pearl mill or ball mill to the desired particle size of aluminium effect pigments. The process of ball milling or pearl milling metal particles is an established process known in the art as "Hall process".

To obtain very thin pigments spherical balls made from a material with weight of 2 to 13 mg per sphere have to be used. Preferred balls are glass spheres.

Furthermore a fine aluminium grit is preferably used as starting material for the production of aluminium effect pigments of the present invention being plate-like in shape.

The average particle size of the aluminium grit $d_{50}$ used for the production of these thin aluminium effect pigments is <20 μm, more preferred <15 μm, still more preferred <10 μm and even more preferred <8 μm. In still another preferred embodiment of the invention the average particle size distribution is characterised as follows: $d_{10}$<3 μm, $d_{50}$<5 μm, $d_{90}$<8 μm.

To obtain a pigment preparation containing very thin aluminium effect pigments with a very tiny thickness distribution, e.g. an aluminium effect pigments having an average thickness $h_{50}$ of 15 to 80 nm and a Δh of 30 to less than 70%, a very fine aluminium grit with a narrow size distribution is preferably used as starting material. Preferably, an aluminium grit with a particle size characteristics of $d_{grit,10}$<3.0 μm, $d_{grit,50}$<5.0 μm and $d_{grit,90}$<8.0 μm is used. More preferably, an aluminium grit with a particle size characteristics of $d_{grit,10}$<0.6 μm, $d_{grit,50}$<2.0 μm and $d_{grit,90}$<4.0 μm is used.

The average thickness $h_{50}$ of the aluminium effect pigments as determined by counting their SEM images (SEM: Scanning Electron Microscope) is preferably 15 to 150 nm.

It turned out that, after applying the ink jet printing ink of the present invention on a substrate, very appealing aluminium effects of the printed ink jet printing ink can be achieved with metal pigments with these very thin average thicknesses.

The aluminium effect pigments in the pigment preparation of the present invention have an average thickness $h_{50}$ of 15 to 150 nm determined by counting their SEM images as will be described below. More preferably the average thickness $h_{50}$ is 15 to 100 nm and even more preferably 20 to 80 nm.

Also a very preferable average thickness $h_{50}$ is 30 to below 80 nm. With such thin aluminium effect pigments very brilliant effects can be achieved. Besides high gloss and high flop the printings have a look of a liquid metal effect which is usually typical for pvd-pigments.

Less brilliant, but still reasonable metallic effects can be achieved with an average thickness $h_{50}$ of 80 to 130 nm.

Below a $h_{50}$ of 15 nm the pigments are too transparent and appear already quite dark due to their reduced reflective properties. Above a $h_{50}$ of 150 nm the optical performance of the aluminium effect pigments decreases and pigment material is wasted because of the reduced hiding power, i.e. the specific coverage which is calculated as the coverage of aluminium effect pigments per weight.

Usually the particle thickness is determined by measuring the water coverage (according to DIN 55923) and/or by Scanning Electron Microscopy (SEM).

The measurement of water coverage only yields an average thickness, but not the distribution of the particle thickness.

For this reason the average thickness of the aluminium effect pigments of the present invention was determined by SEM. Usually at least 100 particles are analysed in order to have a representative statistics.

The relative width of the thickness distribution Δh resulting from counting the Scanning Electron Microscope (SEM) images of the aluminium effect pigments and calculated from the respective number weighted cumulative distribution according to the formula (I)

$$\Delta h = 100(h_{90}-h_{10})/h_{50} \quad (I)$$

("thickness span") is preferably 30 to 140%,
wherein $h_{90}$ is the number pigments covering 90% of the absolute height and $h_{10}$ is the number pigments covering 10% of the absolute height and $h_{50}$ is the number pigments covering 50% of the absolute height of said aluminium effect pigments.

Such pigments are principally disclosed in the WO 2004/087816 A2 which is incorporated by reference therein. However, the aluminium effect pigments of the present invention differ over the ones known from WO 2004/087812 A2 with respect to the specific combination of particle characteristics of the $d_{98}$-value of the volume averaged particle size distribution curve of less than 15 μm and, preferably, an averaged thickness $h_{50}$ of 15 to 150 nm determined by counting from SEM images.

In a more preferable embodiment the relative width of the thickness distribution Δh ranges from 30 to 100% and further preferred from 30 to 70% and still further preferred from 30% to 50%.

Very much preferred are aluminium effect pigments with an average thickness $h_{50}$ of 15 to 80 nm and a Δh of 30 to less than 70%.

Such thin particle thickness distribution curves of the aluminium effect pigments in the pigment preparation of the present invention surprisingly turned out to give optical effects after application of the ink jet printing ink of the present invention on a substrate with a very high gloss and flop-effect and liquid-metal-effect very similar to pvd-aluminium pigments.

A low Δh is necessary to obtain the desired high class optical effects. Pigments with a Δh above 140% do not stack properly in the ink jet printing ink. Furthermore, because of the very short time of orientation, a good orientation can only be achieved in an optimal way for pigments with a Δh of less than 140% and preferably less than 100%.

The ink jet printing ink of the present invention contains very thin aluminium effect pigments with rather narrow spans of the particle size and the particle thickness distribution curves as recited in claims to enable a uniform and short time of orientation of essentially all aluminium effect pigments during and after application of the ink jet printing ink of the present invention.

The aluminium effect pigments in the pigment preparation of the present invention exhibit very high hiding power compared to conventional aluminium effect pigments obtained by grinding methods.

The aluminium effect pigments of the present invention exhibit preferably a thickness distribution curve with a $h_{90}$-value of under 110 nm and more preferably under 75 nm. The $h_{95}$-value of the thickness distribution is preferably below 150 nm and more preferably below 120 nm. Additionally, the $h_{99}$-value is preferably below 140 nm and more preferably below 90 nm.

Such a narrow thickness distribution of the aluminium effect pigments of the present invention leads to a very good stacking in the prints of the printed ink jet printing ink. Therefore, these pigments of the present invention exhibit very good gloss and flop effects.

According to another embodiment of the invention the pigment preparation comprises aluminium effect pigments exhibiting an x-ray diffractogram measured on said aluminium effect pigments in an essentially plane-parallel alignment showing main peaks which are [111]- or [222]-reflections. These aluminium pigments are preferably pvd aluminium pigments.

As set forth above such a pigment preparation of the invention is obtained by comminuting the aluminium particles, which were released from the substrate, in the presence of a solvent (or solvent mixture) having a viscosity of more than 1.8 mPa·s and a phosphorous containing additive.

The aluminium effect pigments, preferably pvd-aluminium pigments, thus obtained have preferably an average thickness $h_{50}$ in a range of 15 to 60 nm, further preferred in a range of 20 to 50 nm, determined by counting from SEM images.

These aluminium effect pigments have preferably a relative width of the thickness distribution Δh of 30% to 50% calculated by the above-explained formula (I):

$$\Delta h = 100(h_{90}-h_{10})/h_{50} \quad (I).$$

The aspect ratio f of the aluminium effect pigments, either produced by ball milling or by pvd methods, in the pigment preparation of the present invention is preferably in a range of about 30 to 500, more preferably the aspect ratio is in a range of about 35 to 300 and most preferably in a range of 40 to 200.

The aspect ratio is the ratio of average particle size divided by average particle thickness and is represented by the following formula (II):

$$f = 1000 * \frac{d_{50}(\mu m)}{h_{50(nm)}} \quad (II)$$

These aspect ratios have been proven useful in order to minimize the time for orientation of the aluminium effect pigments after application of the ink jet printing ink to the surface of substrate.

The aluminium effect pigments in the pigment preparation of the present invention used for the ink jet printing ink of the present invention can be of the leafing or the non-leafing type. According to a preferred embodiment of the invention the aluminium effect pigments are leafing pigments. Leafing pigments arrange themselves in an oriented manner, i.e. essentially parallel to the surface of substrate, at the surface of the ink jet printing ink after printed on a substrate whereas non-leafing pigments arrange themselves within the ink jet printing ink uniformly between substrate to which they are applied and the dried printing ink.

Preferably, leafing aluminium effect pigments are used in the present invention, so that the printed images obtained have a very brilliant and shiny appearance for the observer. The leafing behaviour can be induced by coating the aluminium effect pigments, for example, with stearic acid.

Ink jet printing inks containing prior art aluminium pigments made by pvd-process had certain problems due to agglomeration and to settling of the aluminium particles in the ink jet printing ink.

Surprisingly, these problems are significantly less severe in the ink jet printing ink of the present invention containing the pigment preparation of the present invention wherein the aluminium pigments have the specified size distribution and which further contains a solvent (or solvent mixture) with a viscosity of more than 1.8 mPa·s and a phosphorous containing additive.

Pursuant to another preferred embodiment of the invention the aluminium effect pigments are coated with a layer of corrosion inhibiting material.

The corrosion inhibiting material can be made of an encasing layer of metal oxide and/or organic polymeric material.

Preferably, the metal oxide layer comprises silica, alumina, titanium oxide, iron oxide and mixtures thereof. Most preferably, silica is used as a corrosion inhibiting layer.

The average thickness of this metal oxide layer, preferably silicon oxide layer, is preferably between 10 and 40 nm, further preferred between 15 nm and 30 nm.

A layer of metal oxide may be applied to the surface of the metal pigments by hydrolysing soluble metal salts in the presence of agitated aluminium effect pigments. For example, metal chloride salts can be hydrolysed in water.

Preferably a sol-gel process for coating aluminium effect pigments with a layer of metal oxide is used. For example, an encapsulating layer of $SiO_2$ may be applied by hydrolysing tetraalkoxysilanes, such as, for example, tetraethoxysilane or tetramethoxysilane in alcoholic media in the presence of agitated aluminium effect pigments, sufficient amounts of water and optionally catalysts such as acids or bases.

The polymeric material can be, for example, polyacrylate, polymethyl acrylate, polymethacrylate, polymethylmethacrylate or any other suitable organic polymeric material.

According to another embodiment the phosphorous containing additive comprises at least one phosphinic acid, phosphinic acid ester, phosphonic acid, phosphonic acid ester, phosphoric acid and/or phosphoric acid ester.

The phosphoric acid or phosphoric acid ester have the following general formula (III):

$$(O)P(OR^1)(OR^2)(OR^3) \quad (III),$$

and the phosphonic acid or phosphonic acid ester have the following general formula (IV):

$$(O)PR^4(OR^1)(OR^2) \quad (IV),$$

and the phosphinic acid or phosphinic acid ester have the following general formula (V):

$$(O)PR^4R^5(OR^1) \quad (V),$$

wherein
$R^1$, $R^2$, and $R^3$ are independently from each other H or an organic residue with 1 to 30 C, containing optionally heteroatoms such as O, S, and/or N.
and $R^4$ and $R^5$ are independently an organic residue with 1 to 30 C, containing optionally heteroatoms such as O, S, and/or N.

All the organic residues $R^1$, $R^2$, $R^3$, $R^4$ or $R^5$ can be independently from each other branched or straight alkyl, aryl, alkylaryl, aryl alkyl.

Preferably, the organic residues are straight or branched alkyl having 1 to 24 C, preferably 6 to 18 C, containing optionally heteroatoms such as O, S, and/or N.

Particularly useful are alkyl phosphonic acids having, preferably, an alkyl residue with 6 to 24 C, further preferred 6 to 18 C.

Particularly preferred are octanephosphonic acid or dodecylphosphonic acid.

If $R^1$, $R^2$, and $R^3$ are H, then formula (III) stands for phosphoric acid, formula (IV) stands for phosphonic acid and formula (V) stands for phosphinic acid, respectively.

According to a preferred embodiment of the invention the phosphorous containing additive has an acid number in a range of 50 to 150 mg KOH/g phosphorous containing additive. Further preferred the acid number is in a range of 70 to 120 mg KOH/g phosphorous containing additive.

According to another embodiment of the invention, the phosphorous containing additive has an amine number in a range of 65 to 120 mgKOH/g phosphorous containing additive. Further preferred the amine number is in a range of 80 to 100 mg KOH/g phosphorous containing additive.

Surprisingly, a phosphorous containing additive having at least one acidic group or acidic substituent and at least one amine group, which can be substituted or unsubstituted, are particularly efficient to strongly inhibit the agglomeration of aluminium pigments in the pigment preparation of the present invention.

According to a preferred embodiment of the invention the phosphorous containing additive has an acid number in a range of 50 to 150 mg KOH/g and an amine number in a range of 65 to 100 mg KOH/g. Further preferred the acid number is in a range of 70 to 120 mg KOH/g and the amine number is in a range of 80 to 100 mg KOH/g.

According to another embodiment of the invention the phosphorous containing additive has a molecular weight in a range of 500 to 50.000 g/mol preferably in a range of 550 to 25.000 g/mol, further preferred in range of 600 to 20.000 g/mol.

It turned out that a phosphorous containing additive having at least one phosphoric group, phosphoric acid ester group, phosphonic group, phosphonic acid ester group, phosphinic group and/or phosphinic acid ester group and, preferably, also at least one amine group, are particularly efficient in the pigment preparation of the present invention. Preferably, these compounds have a molecular weight in a range of 500 to 50.000 g/mol preferably in a range of 550 to 25.000 g/mol, further preferred in range of 600 to 20.000 g/mol.

It is of course possible and preferred to use a mixture of various phosphorous containing additives.

The following phosphorous containing additives are particularly useful in the pigment preparation of the invention: Disperbyk-102, 106, 111, 180, 190, 191 and 192 (BYK-Chemie GmbH, Wesel, Germany).

The phosphorous containing additive is preferably used in an amount in a range of 0.01 to 15 wt.-%, preferably in the range of 0.05 to 10 wt.-%, further preferred in the range of 0.1 to 5 wt.-%, each based on the total weight of the pigment preparation. According to another preferred embodiment, the phosphorous containing additive is preferably used in an amount in a range of 0.15 to 4 wt.-%, preferably in the range of 0.2 to 3 wt.-%, each based on the total weight of the pigment preparation.

The amount of aluminium effect pigments in the pigment preparation of the invention is preferably in a range of 1 to 40 wt.-%, further preferred in a range of 5 to 20 wt.-%, based on the total weight of the pigment preparation.

The amount of solvent (or solvent mixture) in the pigment preparation is preferably in a range of 99 to 60 wt.-%, further preferred in a range of 96 to 0.80 wt.-%, based on the total weight of the pigment preparation.

The pigment preparation of the invention can contain further additives, usually in a range of 0 to 10 wt.-%, further preferred in a range of 0.3 to 5 wt.-%, based on the total weight of the pigment preparation, such as grinding agents, biocides, pH-stabiliters, defoamers, matting agents, UV-stabilizers, colorants such as organic or inorganic dyes or pigments and mixtures thereof.

The ink jet printing ink of the present invention can be obtained by incorporating the pigment preparation of the present invention into an ink jet printing ink.

The amount of aluminium effect pigment in the ink jet printing ink of the present invention is preferably in a range from about 1 to 30% by weight, more preferably, from about 2 to 20% by weight, based on the total weight of said ink jet printing ink.

According to another preferred embodiment of the invention the content of the aluminium effect pigment is in a range from about 2.5 to 8% by weight, based on the total weight of said ink jet printing ink.

According to another embodiment of the present invention the ink jet printing ink comprises a binding agent. Preferably, these ink jet printing inks are solvent based systems. The amount of binding agent is in a range of 1 to 99% by weight, based on the total weight of said ink jet printing ink.

Depending on the nature of the substrate to which the ink jet printing ink is to be applied, a binding agent is or is not to be included in the ink jet printing ink. If the binding agent is part of the substrate, e.g. a special ink jet printing paper containing adhesive substances it is not necessary that the ink jet printing ink contains a binding agent.

According to another preferred embodiment of the present invention the ink jet printing ink is based on solvent(s) or water and comprises a binding agent in a range of about 1 to 50% by weight, based on the total weight of said ink jet printing ink. Furthermore, it is preferred that the content of the binding agent amounts to about 2 to 35% by weight, based on the total weight of said ink jet printing ink. More preferably the content of the binding agent is in a range of about 3 to 25% by weight.

According to another preferred embodiment for radiation curing ink jet printing inks, especially for UV ink jet printing inks, the diluent is a reactive diluent, acting also as a binding agent. The amount of the reactive diluent, e.g. liquid oligomers and monomers, is in a range of 1 to 99% by weight, preferably 10 to 95% and more preferably 40 to 90% by weight, based on the total weight of said ink jet printing ink.

That is to say, according to an embodiment of the invention the reactive diluent can be a binding agent.

The binding agent can be any binding agent usually used in ink jet printing inks. Preferred, but not limited thereto, are the following binding agents: UV curable acrylic monomers and oligomers as well as resins of various families, like hydrocarbon resins, modified rosin resins, polyethylene glycol resins, polyamide resins, polyvinylbutyral resins, polyvinyl pyrrolidone resins, polyester resins, polyurethane resins, polyacrylic resins, polyacrylamide resins, polyvinylchloride resins, ketone resins, polyvinyl alcohol resins, modified cellulose or modified nylon resin or other resins soluble in organic solvents or mixtures thereof.

It is preferred that solvent or water based ink jet printing inks comprise a solvent content in an amount of about 10 to 95% by weight, based on the total weight of said ink jet printing ink. According to another preferred embodiment of the invention the content of solvent amounts to about 20 to 94% by weight and more preferably 50 to 93% by weight.

Any solvent or solvent mixture suitable with the ink jet printing ink technology can be used. Preferred solvents are water, alcohols, esters, ethers, thioethers, glycol ethers, glycol ether acetates, amines, amides, ketones and/or hydrocarbons or mixtures thereof.

Examples for alcohols are alkyl alcohols such as, e.g., methyl alcohol, ethyl alcohol, propyl alcohol, iso-propyl alcohol, butyl alcohol, pentyl alcohol, hexyl alcohol, fluorinated alcohols or mixtures thereof.

Examples of ketone solvents are acetone, methyl ethyl ketone or cyclohexanone, diisobutyl ketone, methyl propyl ketone, diacetone alcohol, N-methylpyrrolidone or mixtures thereof.

Examples of esters are methyl acetate, ethyl acetate, 1-methoxy-2-propylacetate propyl acetate, butyl acetate, methyl propionate or ethyl propionate glycolether acetates, butyl glycol acetate or mixtures thereof.

Examples of ether solvents are diethyl ether, dipropyl ether, tetrahydrofuran, dioxane ethylene glycol ethers, in particularly ethylene glycol ethyl ether or ethylene glycol methyl ether which are also marketed under the trademark Cellosolve®, methoxy propanol or mixtures thereof.

In addition, preferred examples of the organic solvents include a mixture of the diethylene glycol compound that is liquid under normal temperature and normal pressure and the dipropylene glycol or 1-methoxy-2-butylglycol compound that are liquid under normal temperature and normal pressure.

Examples of amine solvents are triethanolamine and dimethylethanolamine.

Examples of amide solvents are N-methylpyrrolidone and 2-pyrrolidone.

The hydrocarbon can be selected from the group consisting of terpene hydrocarbons like pinene, limonene, terpinolene; aliphatic hydrocarbons like heptane, mineral spirits, Stoddard solvent and aromatic hydrocarbons like toluene, xylene, solvent naphta and mixtures thereof.

In another embodiment the ink jet printing ink of the present invention is a radiation curable ink, especially an UV curable ink, comprising said solvent in an amount of about 0 to 50% by weight, based on the total weight of said ink jet printing ink. More preferable the solvent content is 0 to 10% by weight, because in UV curable inks solvent usually are not necessary. According to a particularly preferred embodiment of the invention the UV curable ink jet printing ink does not contain a solvent.

According to another embodiment of the invention, the ink jet printing ink has a viscosity in a range of about 1 to 100 mPa·s measured with the Brookfield viscometer LV Model DV-II+ using spindle no. 61 at 100 rpm at a temperature of 21° C. Preferably, the viscosity of the ink jet printing ink is in a range of about 3 mPa·s to 30 mPa·s, more preferred in a range of 5 to 20 mPa·s.

The viscosity can be adjusted to accommodate the type of print head used, the substrate to be printed on, and/or the composition of the ink jet printing ink.

According to another embodiment of the invention, the ink jet printing ink has a surface tension from 20 to 50 mN/m. When the surface tension is less than 20 mN/m, the ink jet printing ink composition wetly spreads over the surface of the printer head for ink jet recording or exudes therefrom, resulting in difficulty of ejecting ink droplets in some cases. When the surface tension exceeds 50 mN/m, the ink composition does not wetly spread over a surface of the recording medium, resulting in failure to perform good printing in some cases.

Preferably, the ink jet printing ink comprises additives, for example dispersing agents, anti-settling agents, lubricants, humectants, surfactants, penetrants or mixtures thereof.

The dispersing agents aid to homogeneously disperse all components in the ink jet printing ink, more specifically the aluminium effect pigments, to avoid any tendency of agglomeration, if any. A dispersing agent may improve a homogenous dispersion of all components of the ink jet printing ink that can be dependent on the nature of the components used. Preferably, the dispersing agent is selected from the group consisting of fatty acids or mixtures thereof.

When an organic solvent is used, the ink jet printing ink composition of the invention can contain a dispersant. As the dispersant, there can be used any dispersant used in an ordinary ink composition such as a gravure ink, offset ink, intaglio ink or screen printing ink. In particular, it is preferred to use a dispersant effectively acting when the solubility parameter of the organic solvent is from 8 to 11. As such a dispersant, it is also possible to utilize a commercial product, and specific examples thereof include Solsperse 20000, 24000, 3000, 32000, 32500, 33500, 34000 and 35200 (Avecia K.K.) or Disperbyk-102, 106, 111, 161, 162, 163, 164, 166, 180, 190, 191 and 192 (BYK-Chemie GmbH).

In further preferred embodiments the ink jet printing ink compositions of the present invention contain anti-settling agents. These substances are desired to prevent settling of the flaky aluminium effect pigments in the ink. Examples are Byk®-405 in combination with pyrogenic silica, modified ureas such as Byk®-410 and Byk®-411 or waxes like Byk Ceramat® 237, Ceramat® 250, Cerafak® 103, Cerafak® 106, or Ceratix® 8461.

In aqueous ink formulations Byk®-420 is especially preferred.

The lubricants aid to improve the through-passing properties of the ink jet printing ink through the print head architecture. Preferably, the lubricant is selected from the group consisting of fatty acids such as stearic acid or oleic acid, fatty acid esters and mixtures thereof.

The humectants are used in water-based ink jet printing inks to avoid any drying out especially while in the print head. The humectants reduce the rate of evaporation and prevent precipitation of dyes, when evaporation occurs at the jet orifice. Preferably, the humectants are selected from the group consisting of polyols, such as glycols, glycerine, sorbitol, polyvinyl alcohols and mixtures thereof.

Biocides can be incorporated into ink jet printing inks in order to prevent growth of microorganisms. For example, polyhexamethylene biguanide, isothiazolones, isothiazolinones such as, e.g., 5-chloro-2-methyl-4-isothiazolin-3-one (CIT), 2-methyl-4-isothiazolin-3-one (MIT), etc. or mixtures thereof can be used.

In addition to aluminium effect pigments various colorants can be incorporated into the ink jet printing ink. For example, various black colorants such as C.I. Solvent Blacks 27, 28, 29, 35, 45; various blue colorants such as C.I. Direct Blues 86, 199; C.I. Solvent Blues 25, 44, 48, 67, 70; various red colorants such as C.I. Acid Red 52; C.I. Solvent Reds 49, 172; C.I. Disperse Red 60; C.I. Pigment Red 122; C.I. and/or various yellow colorants such as Acid Yellow 23; C.I. Direct Yellow 86; C.I. Disperse Yellow 119; C.I. Solvent Yellow 162; Solvent Yellow 146; C.I. Pigment Yellow 17 can be used in combination with the ink jet printing ink of the present invention.

The objective underlying the present invention is further solved by providing a method of printing, applying an ink jet printing ink of any one of claims 1 to 18 onto a surface of a substrate preferably using an ink jet printer.

Preferably the substrate is selected from the group consisting of coated or uncoated paper, coated or uncoated cardboard, plastics, metals, ceramics, glass, textiles and combinations thereof. Most preferred substrates are plastics.

The ink jet printing ink of the present invention can be applied to the substrate using a commercially available ink jet printer. Preferably, the ink jet printer has a container reserved for aluminium effect pigments containing ink jet printing ink. Before printing, the aluminium effect pigment containing ink jet printing ink is preferably sieved through a sieve with a mesh size suitable to remove possible remaining aggregated particles, which could clog the nozzle or other parts of the printing setup.

The objective of the present invention is further solved by a method of producing an ink jet printing ink according to any one of claims 21 to 31, comprising gently mixing the aluminium effect pigments of the present invention with components of ink jet printing inks, e.g. binding agent(s), solvent (s), additive(s), etc., as specified above in detail.

The ink jet printing ink composition of the invention can be prepared by the following method, for example: initially, the pigment preparation of the present invention, comprising the aluminium effect pigment in the specified particle size distribution, a solvent (or solvent mixture) having a viscositiy of more than 1.8 mPa·s and a phosphorous containing additive, optionally a dispersant, and liquid solvent and/or liquid binding agent and/or diluent are gently mixed, without damaging the aluminium effect pigments. Then, a ink jet printing ink is prepared by a ball mill, a pearl mill, a bead mill, an ultrasonic wave, a jet mill or the like to perform adjustment so as to have desired ink jet printing ink characteristics. Subsequently and optionally, liquid solvent and/or additives, for example, a dispersing aid, a viscosity adjusting agent and/or a binder resin are added or additionally added under stirring, thereby obtaining the ink jet printing ink of the present invention.

An ink jet printing ink of the present invention has preferably a viscosity in a range of 1 to 50 mPa·s, measured at a temperature of 25° C. with a Brookfield Viscosimeter LV Model DV-II+ using spindle no. 61 at 100 rpm, a surface tension in a range of 20 to 80 mN/m, measured at a temperature of 25° C. with du Nouy's Ring Method, a pH in a range of 6 to 11 in water based printing inks and having a conductivity in a range of 0.2 to 5 mS/cm, measured at a temperature of 25° C. in/or according to DIN 53779.

An important aspect of the claimed method is that, as mentioned before, the aluminium effect pigments are not damaged during the mixing process. The platelet structure of the aluminium effect pigments is to be preserved in order to maintain the special properties. A bending or twisting of aluminium effect pigments leads to a dramatic loss of the particular specular properties.

For example, the components of the ink jet printing ink of the present invention can be gently mixed using an ultrasonic bath followed by magnetic stirring.

The ink jet printing ink of the present invention can be used with any ink jet printing ink technology. The ink jet printing ink composition of the invention can be applied to various ink jet recording systems. That is to say, it can be applied to various ink jet recording systems such as an electric field controlling system in which ink jet printing ink is ejected utilising electrostatic attraction, a drop-on-demand system (or a pressure pulse system) in which ink is ejected utilising driving pressure of a piezoelectric element, and further, a bubble or thermal system in which ink is ejected utilising pressure developed by forming bubbles and allowing them to grow by high heat.

Preferably, the ink jet printing ink of the present invention is used with the continuous ink jet—CIJ—or impulse or drop-on-demand—DOD—ink jet technology

EXAMPLES

The invention is further illustrated by the following non-limiting examples. It is to be understood that only preferred embodiments are shown and described. It will be manifest to those skilled in the art that certain changes, various modifications and rearrangements of the parts may be made without departing from the spirit and the scope of the underlying inventive concept and that the same is not limited to the particular forms herein shown and described except insofar as indicated in the scope of the appended claims.

Example 1

Pigment A a) Atomizing of Aluminium and Segregation of Aluminium Grit:

Barrels of aluminium were continuously fed and molten into an industrial oven (Company Induga; capacity: 2.5 tons). In a pre-cooker the molten aluminium was held at a temperature of 720° C. Several injectors working after the injector principle were dipping into the melt. The aluminium melt was atomised vertically upstairs. The atomising gas was compressed to about 20 bar and heated up to about 700° C. The aluminium grid cooled down and solidified during the flight through inert gas (nitrogen). The aluminium grit was collected in a cyclone yielding a grit characterised by a $d_{50}$ of 14-17 μm. During further segregation the grit was fed into a multi-cyclone yielding a grit with a $d_{50}$-value of 2.3-2.8 μm. Finally a very fine grit was collected in a filter. This grit had a $d_{10}$-value of 0.4 μm, a $d_{50}$-value of 1.9 μm and a $d_{90}$-value of 3.8 μm.

b) Grinding to Form a Flake

A ball mill (length: 32 cm, width: 19 cm) was fed with 4 kg glass spheres (diameter: 2 mm), 75 g of the fine aluminium grid from a) in 200 g mineral spirit and 3.75 g oleic acid. Subsequently, the mixture was milled for 15 h at a rotation rate of 58 rpm. The product was separated from the balls and than sieved with a 25 μm sieve. The fine pigments were concentrated to a paste containing about 50 wt.-% pigment.

This grinding procedure yielded very thin aluminium flakes having a thickness distribution from $h_{10}$=35 nm, $h_{50}$=54 nm and $h_{90}$=70 nm. The thickness distribution was determined by counting about 100 pigment particles with a SEM as described further in WO 2004/087816 A2.

The particle size distribution as determined by laser diffraction (Cilas 1064) yielded $d_{10}$=7 μm, $d_{50}$=13 μm; $d_{90}$=20 μm.

c) Grinding to Comminute the Pigments:

A ball mill was fed with 10 g of the paste of pigment of b), 1 g Disperbyk 103 (phosphoric acid groups containing dispersant, Byk-Chemie GmbH, Wesel, Deutschland), 0.2 g octylphosphonic acid and 89 g butyl glycol.

The mixture was milled with 4 kg of a ceramic ball mixture having diameters from 0.3 to 0.7 mm for 1 hour at 750 rpm.

After this procedure the aluminium pigments in the obtained preparation had a $d_{100}$ of less than 8 μm. The pigment dispersion obtained was concentrated to a pigment concentration of about 30 wt.-% pigment. This pigment preparation was directly used in the preparation of an ink jet printing ink.

Example 2

Pigment B

A ball mill was fed with 10 g of a dispersion (10 wt.-% pigment) of the commercially available pvd pigment Metalure® L 55700 (ECKART GmbH, Furth, Deutschland), having a $d_{98}$-value value of 21 μm (and a $d_{100}$-value of 30 μm), 1 g Disperbyk 180 (phosphoric acid groups containing dispersant acid number: 95 mgKOH/g additive, amine number: 95 mgKOH/g additive; Byk-Chemie GmbH, Wesel, Deutschland), 0.2 g octylphosphonic acid and 80 g 1-methoxy-2-propanol.

The mixture was milled with 4 kg of a ceramic ball mixture having diameters from 0.3 to 0.7 mm for 1 hour at 750 rpm. After this procedure the aluminium pigments from the obtained preparation had a $d_{100}$ of less than 8 μm. The pigment dispersion obtained was concentrated to a pigment concentration of about 5 wt.-% pigment. This pigment preparation was directly used in the preparation of an ink jet printing ink.

Pigment C of the grinding procedure of example 2 was repeated except that instead of Disperbyk additives only 2 g octylphosphonic acid were used.

Preparation of Printing Ink

Printing Ink 1 (for Drop-on-demand Printing):

7 g pigment preparation (Pigment A)

+

Ink Vehicle Printing Ink 1:

40 g 1-hexanol (solvent)

12 g 1-methoxy-2-propanol (solvent)

22 g Arizona 0201-147 (polyamide resin, supplied by Arizona chemical Savannah, Ga., USA)

The solvent blend is heated to 75° C. and the resin portion gradually added. The mixture is agitated with a medium speed mixer until all resin particles have been dissolved. The finished resin solution is cooled down to room temperature and then filtered through a sub-micron media filter.

Ink Jet Printing Ink Preparation:

7 parts Pigment B are added slowly to 74 parts of Ink Vehicle A and stirred continuously for 15 minutes with a medium speed disperser. The mixture is then subsequently treated in an ultrasonic bath for additional 5 minutes.

The finished ink jet printing ink is then filtered through a 20 µm mesh filter to remove undesired oversize particles or agglomerates created during the manufacturing process.

Printing:

The finished ink jet printing ink is transferred into a reservoir which allows continuous agitation with a stirrer. The ink jet printing ink is fed into a print head architecture fitted with the necessary peripheral equipment needed to operate the print head. The jetting temperature is adjusted to reach the desired fluid viscosity range of 8-20 mPa·s.

| | |
|---|---|
| Print Head: | Spectra Nova PH 256/80 AAA |
| Support System: | Spectra Apollo I Print head support kit |
| Conditions: | Jetting Temperature 70 C. |
| | Jetting frequency 1.5 kHz |

Printing Ink 2 (for Drop-on-demand Printing):
47 g pigment preparation (Pigment C)
+
Vehicle Printing Ink 2:
49.5 g butyl glycol acetate (solvent)
20 g Joncryl 611 (polyacrylate resin obtainable by Spec. Chem. S.R.L.)
0.5 g Fluorad FC 4430 (tenside obtainable by 3M Speciality Materials)

The same procedure of printing ink 1 was repeated except that 47 g pigment preparation (Pigment C) were added to 70 g of vehicle Printing Ink 2.

Printing:

The finished ink jet printing ink is transferred into a reservoir which allows continuous agitation with a stirrer. The ink jet printing ink is fed into a print head architecture fitted with the necessary peripheral equipment needed to operate the print head. The jetting temperature is adjusted to reach the desired fluid viscosity range of 8-20 mPa·s.

| | |
|---|---|
| Print Head: | Spectra Nova PH 256/80 AAA |
| Support System: | Spectra Apollo I Print head support kit |
| Conditions: | Jetting Temperature 70 C. |
| | Jetting frequency 1.5 kHz |

Printing Ink 3 (for Continuous Jet Printing)
45 g pigment preparation (Pigment B)
+
Vehicle Printing Ink 3:
66 g methyl ethyl ketone (solvent)
3 g Degalan (acrylate resin obtainable by Roehm GmbH, Germany)
1 g NaSCN (conductivity agent)

Printing Ink 4 (for Drop-on-demand Printing)
120 g pigment preparation (Pigment C)
+
Vehicle Printing Ink 4:
54.2 g water (solvent)
20 g diethylenglycol (solvent)
5 g 1.6 hexanediol (drying inhibitor)
5 g Joncryl 661 (polyacrylate resin obtainable by Spec. Chem. S.R.L.)
0.5 g Genapol X080 (tenside obtainable by Clariant, Germany)
0.3 g Acticide MBS (biocide)

The same procedure of printing ink 1 was repeated except that 120 g pigment preparation (Pigment C) were added to 85 g of vehicle Printing Ink 2.

Printing:

The finished ink jet printing ink is transferred into a reservoir which allows continuous agitation with a stirrer. The ink jet printing ink is fed into a print head architecture fitted with the necessary peripheral equipment needed to operate the print head. The jetting temperature is adjusted to reach the desired fluid viscosity range of 8-20 mPa·s.

Print Head: HP 51645A
Printer: HP Desk Jet 880C
Conditions: Plain Paper/best

What is claimed is:

1. A pigment preparation comprising aluminium effect pigments, a solvent and at least one additive,
    wherein said aluminium effect pigments have a $d_{98}$ value of the volume averaged particle size distribution curve of less than 15 µm, and wherein the aluminum effect pigments have an average thickness $h_{50}$ of from 15 to 80 nm,
    said at least one additive is a phosphorous containing additive selected from the group consisting of phosphonic acid, phosphoric acid ester, phosphoric acid, phosphoric acid ester, phosphinic acid and phosphinic acid ester, and
    said solvent has a viscosity equal to or more than 1.8 mPa·s at 25° C.

2. The pigment preparation of claim 1,
    wherein said aluminium effect pigments have a $d_{98}$ value of less than 12 µm.

3. The pigment preparation of claim 1,
    wherein said aluminium effect pigments have a $d_{100}$ value of less than 12 µm.

4. The pigment preparation of claim 1,
    wherein said aluminium effect pigments have a $d_{50}$ value in a range between 1 and 6 µm.

5. The pigment preparation of claim 1,
    wherein said aluminium effect pigments are ball-milled aluminium particles.

6. The pigment preparation of claim 1,
    wherein said aluminium effect pigments exhibit an x-ray diffractogram measured on said aluminium effect pigments in an essentially plane-parallel alignment showing main peaks which are not [111]- or [222]- reflections.

7. The pigment preparation of claim 1,
    wherein said aluminium effect pigments have an average thickness $h_{50}$ in the range of 15 to 150 nm, determined by counting from SEM images.

8. The pigment preparation of claim 1,
    wherein said aluminium effect pigments have a relative width of the thickness distribution Δh of 30% to 150% calculated by the following formula (I):

$$\Delta h = 100(h_{90} - h_{10})/h_{50}$$

wherein $h_{90}$ is the number pigments covering 90% of the absolute height and $h_{10}$ is the number pigments covering 10% of the absolute height and $h_{50}$ is the number pigments covering 50% of the absolute height of said aluminium effect pigments.

9. The pigment preparation of claim 8,
    wherein said aluminium effect pigments have a relative width of the thickness distribution Δh in a range of 35% to 70%.

10. The pigment preparation of claim 8,
wherein said aluminium effect pigments have an average thickness $h_{50}$ of 15 to 80 nm.

11. The pigment preparation of claim 1,
wherein said aluminium effect pigments exhibit an x-ray diffractogram measured on said aluminium effect pigments in an essentially plane-parallel alignment showing main peaks which are [111]- or [222]-reflections.

12. The pigment preparation of claim 11, wherein said aluminium effect pigments are PVD-aluminium pigments.

13. The pigment preparation of claim 11,
wherein said aluminium effect pigments have an average thickness $h_{50}$ in a range of 15 to 60 nm, determined by counting from SEM images.

14. The pigment preparation of claim 11,
wherein said aluminium effect pigments have a relative width of the thickness distribution $\Delta h$ of 30% to 50% calculated by the following formula (I):

$$\Delta h=100(h_{90}-h_{10})/h_{50} \qquad (I),$$

wherein $h_{90}$ is the number pigments covering 90% of the absolute height and $h_{10}$ is the number pigments covering 10% of the absolute height and $h_{50}$ is the number pigments covering 50% of the absolute height of said aluminium effect pigments.

15. The pigment preparation of claim 1,
wherein said aluminium effect pigments have an aspect ratio $d_{50}/h_{50}$ in a range of 30 to 500.

16. The pigment preparation of claim 1,
wherein said phosphorous containing additive comprises at least one selected from the group consisting of one phosphonic acid, phosphonic acid ester, phosphoric acid, phosphoric acid ester, phosphinic acid and phosphinic acid ester.

17. The pigment preparation of claim 1,
wherein said phosphorous containing additive has an acid number in a range of 50 to 150 mg KOH/g phosphorous containing additive.

18. The pigment preparation of claim 1,
wherein said phosphorous containing additive has an amine number in a range of 65 to 120 mg KOH/g phosphorous containing additive.

19. The pigment preparation of claim 1,
wherein said phosphorous containing additive is a resin having an acid number in a range of 50 to 150 mg KOH/g resin and an amine number in a range of 65 to 120 mg KOH/g.

20. The pigment preparation of claim 16,
wherein said phosphorous containing additive is at least one of phosphoric acids or phosphoric acid esters having the following general formula (III):

$$(O)P(OR^1)(OR^2)(OR^3) \qquad (III),$$

and phosphonic acids or phosphonic acid esters having the following general formula (IV):

$$(O)PR^4(OR^1)(OR^2) \qquad (IV),$$

and phosphinic acid or phosphinic acid esters having the following general formula (V):

$$(O)PR^4R^5(OR^1) \qquad (V),$$

wherein $R^1$, $R^2$, and $R^3$ are independently from each other H or an organic residue with 1 to 30 C, containing optionally at least one heteroatom,
and $R^4$ and $R^5$ are independently an organic residue with 1 to 30 C, containing optionally at least one heteroatom,
and all the organic residues $R^1$, $R^2$, $R^3$, $R^4$, and $R^5$ can be independently from each other one selected from branched and straight alkyl, aryl, alkylaryl and aryl alkyl.

21. The pigment preparation of claim 20,
wherein said phosphorous containing additive comprises a phosphonic acid with $R^1=R^2=H$ and $R^4$ is selected from a branched and straight alkyl, aryl, alkylaryl and aryl alkyl with 6 to 18 C-atoms.

22. The pigment preparation of claim 1,
wherein said aluminium effect pigments are coated with a layer of corrosion inhibiting material.

23. The pigment preparation of claim 22,
wherein said corrosion inhibiting material is at least one of metal oxide and organic polymer.

24. The pigment preparation of claim 22,
wherein said metal oxide is selected from the group consisting of silicon oxide, aluminium oxide, titanium oxide, iron oxide, mixtures thereof and combinations thereof.

25. An ink jet printing ink comprising a pigment preparation comprising aluminum effect pigments, a solvent and at least one additive,
wherein said aluminum effect pigments have a $d_{98}$ value of the volume averaged particle size distribution curve of less than 15 µm, and wherein the aluminum effect pigments have an average thickness $h_{50}$ of from 15 to 80 nm,
said at least one additive is a phosphorous-containing additive selected from the group consisting of phosphonic acid, phosphonic acid ester, phosphoric acid, phosphoric acid ester, phosphinic acid and phosphinic acid ester, and
said solvent has a viscosity equal to or more than 1.8 mPa's at 25°C.

26. The ink jet printing ink of claim 25, further comprising at least one binding agent.

27. The ink jet printing ink of claim 26,
wherein said binding agent is present in an amount of about 1 to 99% by weight, based on the total weight of said ink jet printing ink.

28. The ink jet printing ink of claim 25,
wherein said ink jet printing ink is based on solvents or water or mixtures thereof and comprises a binding agent in an amount of about 1 to 50% by weight, based on the total weight of said ink jet printing ink.

29. The ink jet printing ink of claim 25,
wherein said ink jet printing ink is a radiation curable ink further comprising a diluent and said diluent is a reactive diluent.

30. The ink jet printing ink of claim 25,
wherein said solvent is selected from the group consisting of water, alcohols, esters, ethers, thioethers, glycol ethers, glycol ether acetates, amines, amides, ketons, hydrocarbons and mixtures thereof.

31. The ink jet printing ink of claim 25,
wherein the said ink jet printing ink is a solvent based or water based ink and comprises said solvent or water in an amount of about 10 to 95% by weight, based on the total weight of said ink jet printing ink.

32. The ink jet printing ink of claim 29,
wherein the said ink jet printing ink is a radiation curable ink comprising a solvent in an amount of about 10% to 50% by weight, based on the total weight of said ink jet printing ink.

33. The ink jet printing ink of claim 25,
wherein the ink jet printing ink further comprises at least one additive selected from the group consisting of dispersing agents, lubricants, humectants, surfactants, penetrants and mixtures thereof.

34. The ink jet printing ink of claim 25,
wherein said ink is comprised of said aluminium effect pigments in an amount of about 1 to 30% by weight, based on the total weight of said ink jet printing ink.

35. The ink jet printing ink of claim 25,
wherein said ink jet printing ink has a viscosity in a range of about 1 to 100 mPa·s measured with the Brookfield viscometer LV Model DV-II+using spindle no. 61 at 100 rpm at a temperature of 25° C.

36. A method of printing comprising applying the ink jet printing ink of claim 25 on a surface of a substrate ink.

37. The method of claim 36,
wherein said substrate is selected from the group consisting of coated and uncoated paper, coated and uncoated cardboard, plastics, metals, ceramics, glass, textiles and combinations thereof.

38. A method of producing an ink jet printing ink comprising gently mixing a pigment preparation comprising aluminum effect pigments, a solvent and at least one additive,
wherein said aluminium effect pigments have a $d_{98}$ value of the volume averaged particle size distribution curve of less than 15 μm, and wherein the aluminum effect pigments have an average thickness $h_{50}$ of from 15 to 80 nm,
said at least one additive is a phosphorous containing additive selected from the group consisting of phosphonic acid, phosphoric acid ester, phosphoric acid, phosphoric acid ester, phosphinic acid and phosphinic acid ester, and
said solvent has a viscosity equal to or more than 1.8 mPa·s at 25° C. with at least one component of an ink jet printing ink selected from the group consisting of solvents, diluents, additives and binding agents.

39. An article coated with a pigment preparation according to claim 1.

40. The pigment preparation of claim 1, wherein said aluminum effect pigments have a $d_{98}$ value of less than 8 μm.

41. The pigment preparation of claim 1, wherein said aluminum effect pigments have a $d_{100}$ value of less than 8 μm.

42. The pigment preparation of claim 1, wherein said aluminum effect pigments have an average thickness $h_{50}$ in the range of 20 to 80 nm, determined by counting from SEM images.

43. The pigment preparation of claim 8, wherein said aluminum effect pigments have a relative width of the thickness distribution Δh in a range of 30% to 50%.

44. The pigment preparation of claim 10, wherein said aluminum effect pigments have a Δh of 30 to less than 70%.

45. The pigment preparation of claim 11, wherein said aluminum effect pigments have an average thickness $h_{50}$ in a range of 20 to 50 nm, determined by counting from SEM images.

46. The pigment preparation of claim 20, wherein said at least one heteroatom is selected from the group consisting of O, S and N.

47. An article coated with an ink jet printing ink according to claim 25.

48. The method according to claim 36 wherein said ink jet printing ink is applied to said surface by an ink jet printer.

49. A UV-curable ink jet printing ink composition comprising a pigment preparation comprising aluminum effect pigments, at least one additive, and optionally a solvent in an amount of about 0 to 50% by weight, based on the total weight of the ink jet printing ink, wherein said solvent has a viscosity equal to or more than 1.8 mPa's at 25° C., and
wherein said aluminum effect pigments have a $d_{98}$ value of the volume averaged particle size distribution curve of less than 15 μm and wherein the aluminum effect pigments have an average thickness $h_{50}$ of from 15 to 80 nm, and
said at least one additive is a phosphorous-containing additive selected from the group consisting of phosphonic acid, phosphonic acid ester, phosphoric acid, phosphoric acid ester, phosphinic acid and phosphinic acid ester.

* * * * *